United States Patent
Glanfield et al.

(10) Patent No.: US 9,605,707 B2
(45) Date of Patent: Mar. 28, 2017

(54) CENTRIFUGAL SWITCH FOR PENDULUM VIBRATION ABSORBER

(71) Applicants: Ian S Glanfield, Amherstburg (CA); Bruce Geist, Sterling Heights, MI (US)

(72) Inventors: Ian S Glanfield, Amherstburg (CA); Bruce Geist, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 275 days.

(21) Appl. No.: 14/460,005

(22) Filed: Aug. 14, 2014

(65) Prior Publication Data

US 2015/0047461 A1 Feb. 19, 2015

Related U.S. Application Data

(60) Provisional application No. 61/867,208, filed on Aug. 19, 2013.

(51) Int. Cl.
*F16F 15/14* (2006.01)
*F16F 15/26* (2006.01)
*F16C 3/20* (2006.01)

(52) U.S. Cl.
CPC ............. *F16C 3/20* (2013.01); *F16F 15/145* (2013.01); *F16F 15/26* (2013.01); *Y10T 74/2184* (2015.01)

(58) Field of Classification Search
CPC ...... F16C 3/12; F16C 3/20; F16C 3/26; F16F 15/145; F16F 15/1457; F16F 15/1407; F16F 15/1414; F16F 15/1428; F16F 15/26; F16F 15/28; F16F 15/283; F16F 15/286; F16F 15/30; F16F 15/301; F16F 15/315; Y10T 74/21284; Y10T 74/2183; Y10T 74/2178; Y10T 74/2173; Y10T 74/2128; Y10T 74/2132; Y10T 74/2119
See application file for complete search history.

(56) References Cited

U.S. PATENT DOCUMENTS

| 2,184,734 | A | * | 12/1939 | Chilton | F16F 15/145 74/574.3 |
| 2,284,866 | A | * | 6/1942 | Hansson | B29C 47/023 156/432 |
| 2,287,866 | A | * | 6/1942 | Criswell | F16F 15/283 74/571.11 |
| 2,496,836 | A | | 2/1950 | Williams | |
| 5,884,735 | A | * | 3/1999 | Eckel | F16F 15/145 188/378 |

(Continued)

FOREIGN PATENT DOCUMENTS

DE 102013224468 A1 * 6/2014 ............ F16F 15/145

*Primary Examiner* — Daniel Yabut
(74) *Attorney, Agent, or Firm* — Ralph E. Smith

(57) ABSTRACT

A crankshaft assembly for an internal combustion engine can include a crankshaft having a lobe with a pendulum absorber coupled thereto. The pendulum absorber can include a carrier, a pendulum, a pin and a centrifugal switch assembly. The carrier can be coupled to a body of the lobe and can have an opening therein. The pendulum can have an opening therein and the pin can extend through the pendulum opening and the carrier opening to pivotably couple the pendulum to the carrier. The switch assembly can be slidably positioned in a bore of the body and can have a lock member configured to selectively engage the pendulum based on a centrifugal force being below a predetermined threshold to lock movement of the pendulum relative to the carrier.

17 Claims, 8 Drawing Sheets

(56) References Cited

U.S. PATENT DOCUMENTS

| | | | | |
|---|---|---|---|---|
| 6,427,656 B1 * | 8/2002 | Drecq | ................... | F16F 15/145 |
| | | | | 123/192.1 |
| 6,450,065 B1 * | 9/2002 | Eckel | ................... | F16F 15/145 |
| | | | | 74/574.4 |
| 6,688,272 B2 | 2/2004 | Brevick et al. | | |
| 7,509,890 B2 | 3/2009 | Cagney et al. | | |
| 2011/0031058 A1 | 2/2011 | Klotz et al. | | |
| 2013/0098198 A1 | 4/2013 | Geist et al. | | |

* cited by examiner

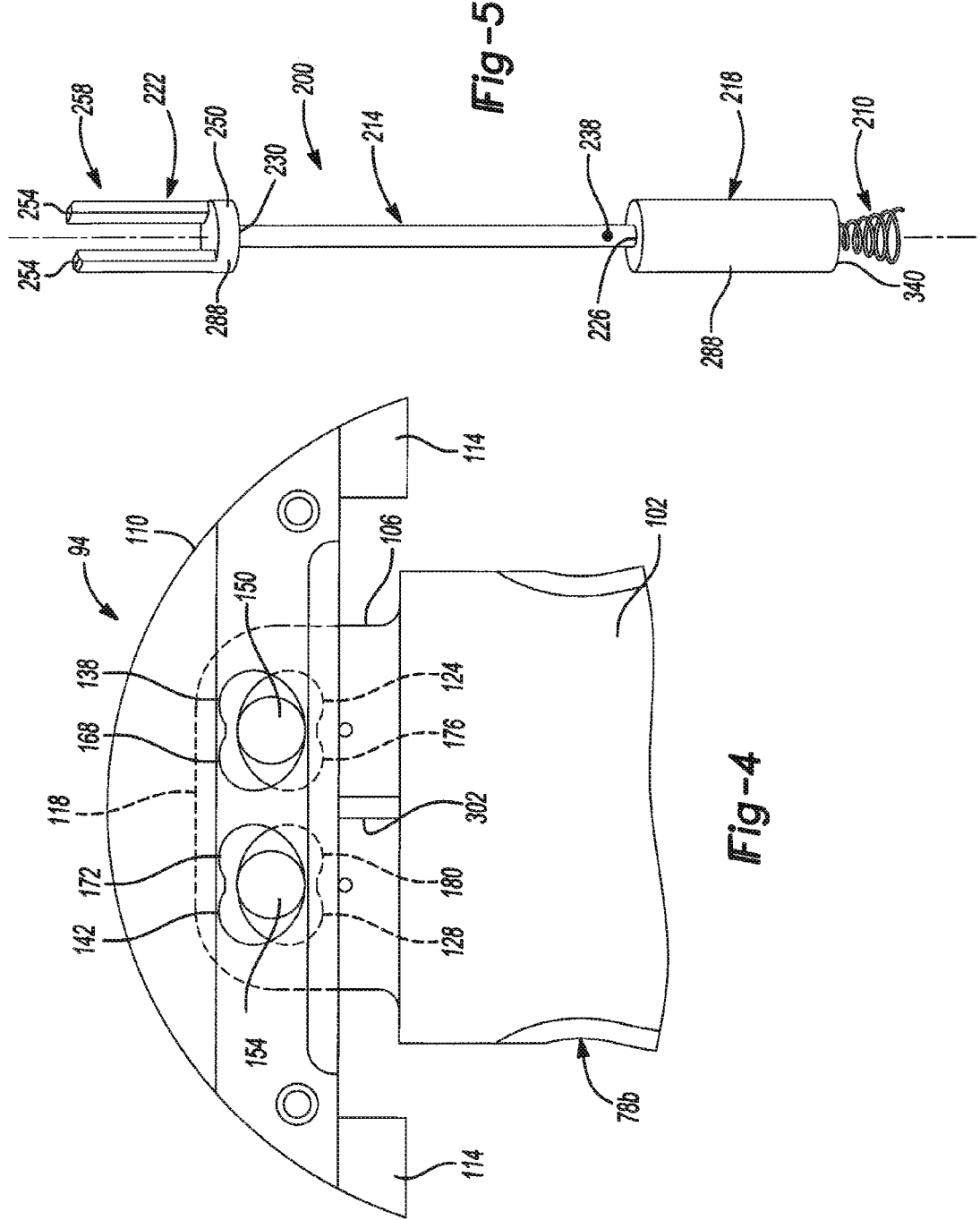

CENTRIFUGAL SWITCH FOR PENDULUM VIBRATION ABSORBER

CROSS-REFERENCE TO RELATED APPLICATION

This application claims the benefit of U.S. provisional Ser. No. 61/867,208, filed Aug. 19, 2013.

FIELD

The present disclosure relates generally to a pendulum vibration absorber and, more particularly, to a centrifugal switch for a crankshaft pendulum vibration absorber.

BACKGROUND

A crankshaft in a vehicle translates the reciprocating linear motion of an engine's pistons into rotational motion. In so doing, torsional vibrations are generated that can emanate through the vehicle. A four cycle engine with 8, 6, or 4 cylinders tends to produce (respectively) 4, 3 or 2 combustion pulse accelerations per engine revolution. These combustion pulses tend to accelerate the crank and driveline at a frequency that is a multiple of 4, 3 or 2 of the average rotational speed of the engine.

Vibrations generated as a result of these pulsations may be uncomfortable for the operator and/or passengers of the vehicle and are undesirable. Vibrations can be directly transferred to the passenger of the vehicle compartment when the torque converter is locked to increase the fuel efficiency of the vehicle. To reduce the vibrations, the crankshaft may have a frequency tuned dampener that counteracts vibrations at certain frequencies. However, the frequency tuned dampener only operates at one frequency and does not reduce vibrations that occur at other frequencies.

Alternatively, a circular-path pendulum, with a properly calibrated swing radius, may be attached to the crankshaft at a calibrated distance from its center of rotation. This sort of pendulum can act to reduce torsional vibrations that occur at a frequency that is a specific order or multiple of average engine speed. One drawback of a circular-path pendulum, however, is that if the pendulum is overdriven, it may act as a torsional amplifier instead of as an absorber. This could result in increased powertrain vibrations that may cause damage to the vehicle and discomfort to the operator and passengers of the vehicle. Another drawback of the circular-path pendulum and/or other pendulum absorbers is the potential for the absorber to hit its travel limits, which could result in driver or occupant perceivable noise and/or vibrations. Therefore the inventors herein recognized a need for improvement in the relevant art.

SUMMARY

In one form, a crankshaft assembly for an internal combustion engine is provided in accordance with the teachings of the present disclosure. The crankshaft assembly can include a crankshaft having a lobe with a pendulum absorber coupled thereto. The pendulum absorber can include a carrier, a pendulum, a pin and a centrifugal switch assembly. The carrier can be coupled to a body of the lobe and can have an opening therein. The pendulum can have an opening therein and the pin can extend through the pendulum opening and the carrier opening to pivotably couple the pendulum to the carrier. The switch assembly can be slidably positioned in a bore of the body and can have a lock member configured to selectively engage the pendulum based on a centrifugal force being below a predetermined threshold to lock movement of the pendulum relative to the carrier.

In another form, a crankshaft assembly for an internal combustion engine is provided in accordance with the teachings of the present disclosure. The crankshaft assembly can include a crankshaft having a lobe with a pendulum absorber coupled thereto. The pendulum absorber can include a carrier, a pendulum, a pin and a centrifugal switch assembly. The carrier can be coupled to a body of the lobe and can have an opening therein. The pendulum can have an opening therein and the pin can extend through the pendulum opening and the carrier opening to pivotably couple the pendulum to the carrier. The pendulum opening and the carrier opening can have a configuration that produces epicycloidal pendulum motion. The centrifugal switch assembly can be slidably positioned in a bore of the body and can have a biasing member and a lock member. The lock member can be configured to i) selectively engage the pendulum based on a centrifugal force being below a predetermined threshold to lock movement of the pendulum relative to the carrier, and ii) selectively disengage from the pendulum against a biasing force of the biasing member based on the centrifugal force being above the predetermined threshold.

According to various embodiments, the switch assembly can further include a body coupled at a first end to a mass member and at a second opposite end to the lock member. The mass member and a center of mass of the switch assembly can be positioned on a first side of a center of rotation of the crankshaft opposite the pendulum absorber and the lock member can be positioned on a second opposite side of the crankshaft center of rotation.

In some configurations, a weight of the mass member can be selected such that the switch assembly is tuned to overcome the biasing force of the biasing member at a predetermined RPM based on the centrifugal force generated by rotation of the crankshaft being greater than the biasing force of the biasing member. For example, when the crankshaft rotation speed is above the predetermined RPM, the switch assembly is configured to move in a direction away from the pendulum absorber against the biasing force of the biasing member to a disengaged position relative to the pendulum.

In accordance with various embodiments, the lock member can include a pair of spaced apart axially extending lock pins that slidably engage channels in first and second opposed sides of the carrier. The lock pins can selectively engage channels in opposed walls of the pendulum when the switch assembly is in the engaged position to lock the pendulum and can be spaced apart from the pendulum channels when the switch assembly is in the disengaged position.

According to various embodiments, the pendulum can define a hollow interior having first and second opposed walls, and the carrier can be received in the hollow interior between the first and second opposed inner walls. In these various embodiments, the pendulum channels can be formed in the first and second opposed inner walls. The lock pins can slidably engage the carrier channels and selectively slidably engage the pendulum channels such that the lock pins are positioned between the opposed outer walls of the carrier and the respective opposed inner walls of the pendulum when engaged with the pendulum.

In accordance with various embodiments, the pendulum opening and the carrier opening can have a configuration that, as the crankshaft rotates, causes the pendulum to follow an epicycloidal path within a coordinate system fixed to the crank. The epicycloidal pendulum motion path can lie on a continuum between a tautochronic configuration and a cycloidal configuration.

According to various embodiments, the carrier can include a second opening and the pendulum can include a second opening. In these various embodiments, a second pin can extend through the second pendulum opening and the second carrier opening to pivotably couple the pendulum to the carrier.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4 is a front view of the lobe of FIG. 3 in accordance with the teachings of the present disclosure;

FIG. 5 is a view of an exemplary centrifugal switch assembly of the crankshaft assembly in accordance with the teachings of the present disclosure;

DESCRIPTION

Figure 1:
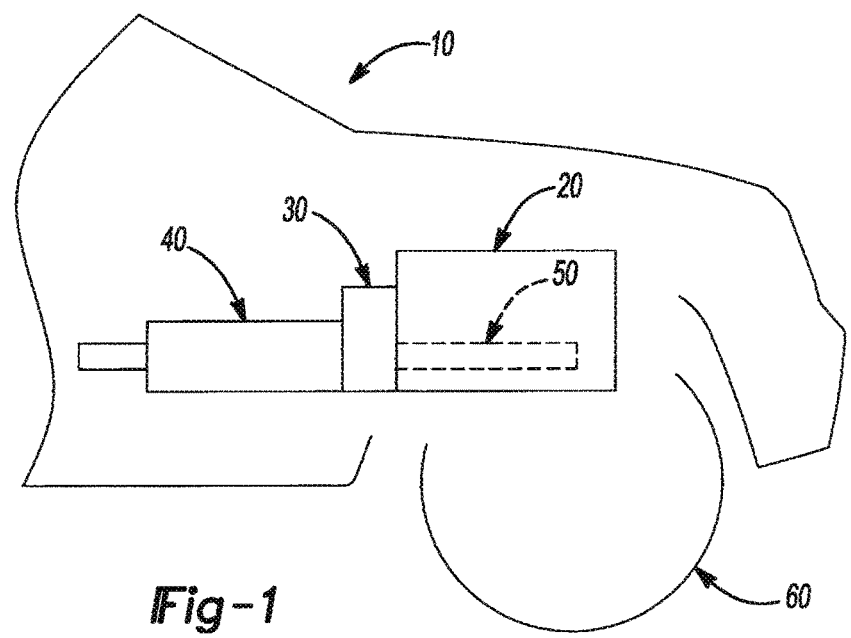
FIG. 1 schematically illustrates a vehicle with an internal combustion engine, a torque converter and a transmission in accordance with the teachings of the present disclosure.

FIG. 1 illustrates a vehicle 10 with an internal combustion engine 20, a torque converter 30, and a transmission 40 according to an exemplary embodiment. The engine 20 has a plurality of cylinders (not shown) formed therein. Each cylinder contains a piston (not shown) that reciprocates during operation of the engine 20. The pistons are mechanically coupled to a crankshaft assembly 50 via connecting rods. The crankshaft assembly 50 is mechanically coupled to the torque converter 30. The torque converter 30 transfers torque generated by the engine 20 to the transmission 40 to power the vehicle's wheels 60. It should be understood that FIG. 1 is a basic diagram of a vehicle 10 having an exemplary powertrain. Additional parts and other configurations may be implemented without diverging from the scope of this application.

In one exemplary embodiment, the crankshaft assembly 50 can include a torsional absorber and a centrifugal switch assembly, as will be discussed in greater detail herein. Briefly, however, the torsional absorber can dampen vibrations of a crankshaft while not acting as a vibrational amplifier, and the centrifugal switch can act as a speed sensitive locking device to mitigate potential excess travel of a pendulum associated with the torsional absorber.

Figure 2:
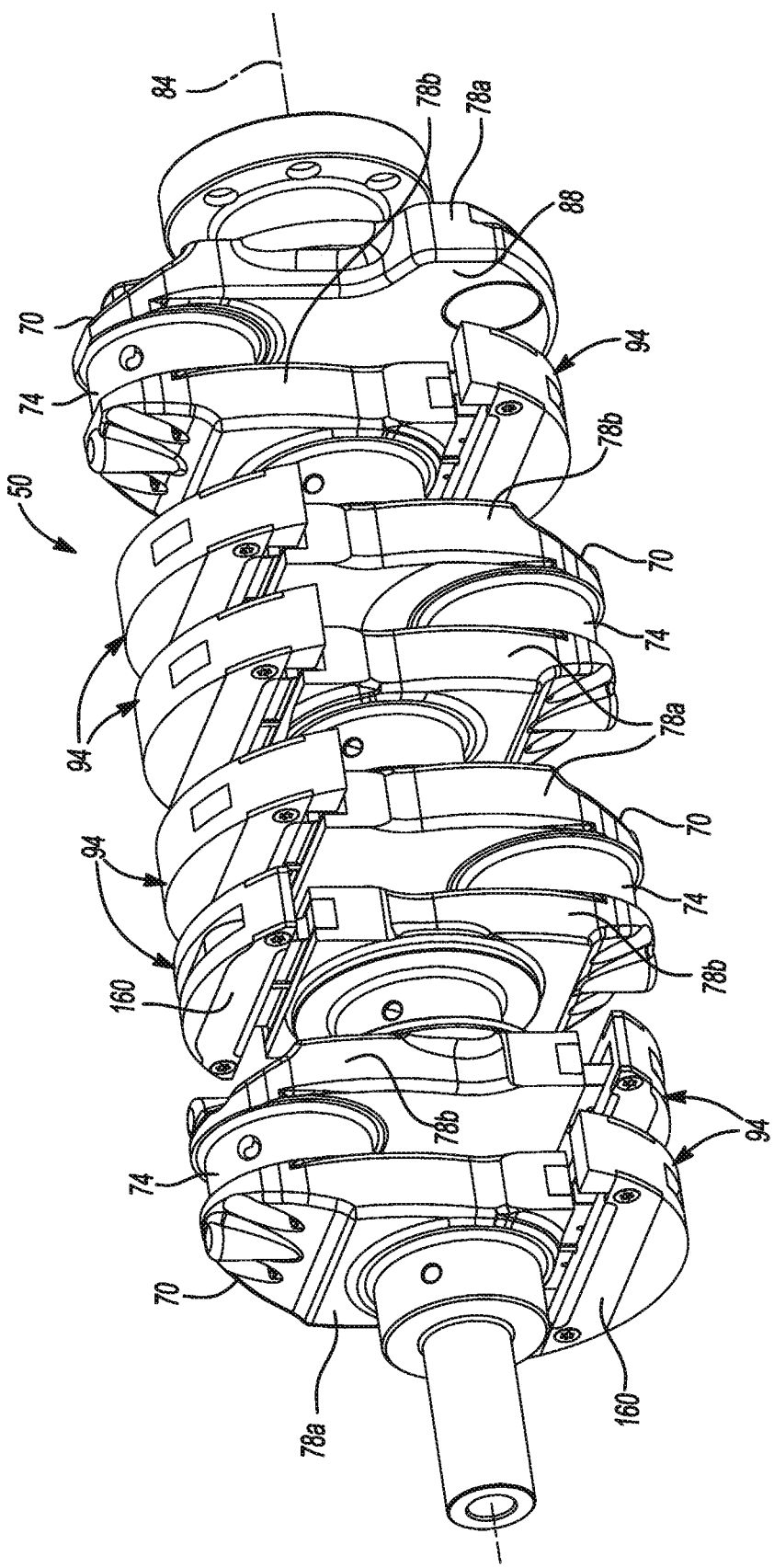
FIG. 2 is a perspective view of an exemplary crankshaft assembly in accordance with the teachings of the present disclosure.

FIG. 2 illustrates an exemplary embodiment of the crankshaft assembly 50 in further detail. The crankshaft assembly 50 can include four interconnected crank nodes 70. In another embodiment, the crankshaft 50 may have six or eight interconnected crank nodes 70. Each crank node 70 can include a crank pin 74 and first and second lobes 78a, 78b. Each lobe 78a, 78b can have an oval plate-like shape extending in a plane perpendicular to an axis of rotation or centerline 84 of the crankshaft 50. The center of each lobe 78a, 78b can be aligned near the axis of rotation 84. One end of each lobe 78a, 78b can be connected to the crank pin 74. The crank pin 74 can connect to a single piston in the engine 20 through a connecting rod (not shown). The crank pin 74 can allow a piston to rotate the crankshaft 50 along its axis of rotation 84.

In one exemplary embodiment, the first lobe 78a of each crank node 70 can contain a counterweight 88 on an end opposite the end connected to the crank pin 74. The counterweight 88 can balance the motion of the piston and connecting rod assemblies within the engine 20. The counterweights 88 can be integrally formed as part of the lobe 78a or they can be attached to the lobe 78a. Moreover, in another embodiment, first lobe 78a may not contain a counterweight 88.

In this exemplary embodiment, the second lobe 78b of each crank node 70 can contain a torsional absorber 94 on an end opposite the end connected to the crank pin 74. The torsional absorber 94 can reduce the torsional vibrations on the crankshaft 50 that occur from the forces applied to the crankshaft 50 by the engine 20 through the connecting rods. The torsional absorber 94 can also reduce torsional vibrations on the crankshaft 50 that occur when the torque converter 30 is locked to enhance the efficiency of the power transfer between the engine 20 and the transmission 40. Additionally, the torsional absorber 94 can act as a counterweight to balance the motion of the piston and connecting rod assemblies within the engine 20.

In the exemplary embodiment illustrated in FIG. 2 and various other figures, the first and second lobes 78a, 78b of three of the four crank nodes 70 can include torsional absorbers 94, and only lobe 78b of the fourth crank node 70 can include a torsional absorber 94 with the lobe 78a thereof having a counterweight 88. In another embodiment, only two of the four crank nodes 70 can contain torsional absorbers 94. In yet another embodiment, only one of the four crank nodes 70 can contain torsional absorbers 94. In still another embodiment, the crankshaft 50 can contain six crank nodes 70 and only two of the crank nodes 70 contain torsional absorbers 94. It should be understood that a varying number of crank nodes 70, counterweights 88, and torsional absorbers 94 can be implemented depending on the configuration of the engine 20 and the vehicle 10, and the amplitude and number of frequencies to be dampened.

Figure 3:
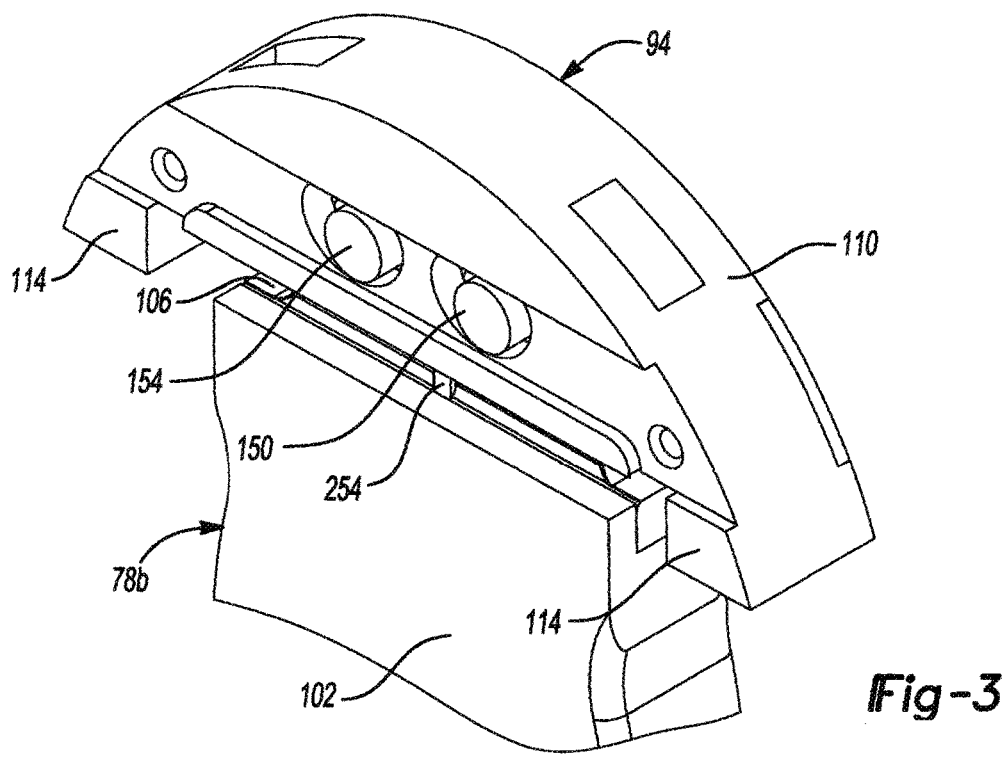
FIG. 3 is a perspective view of a lobe of the crankshaft of FIG. 2 having an exemplary torsional absorber in accordance with the teachings of the present disclosure.

FIGS. 3 and 4 illustrate views of the lobe 78*b* with a torsional absorber 94 in accordance with an exemplary embodiment. The lobe 78*b* can include a body 102 that is coupled to the torsional absorber 94. The torsional absorber 94 can include a flange or carrier 106 that is coupled to the body 102 and a pendulum 110 that is pivotally coupled to the carrier 106. The carrier 106 can include optional extensions 114 and an upper or head portion 118 that extends away from the extensions 114 within the plane of the body 102. The head portion 118 can include first and second openings 124, 128.

Figure 6:
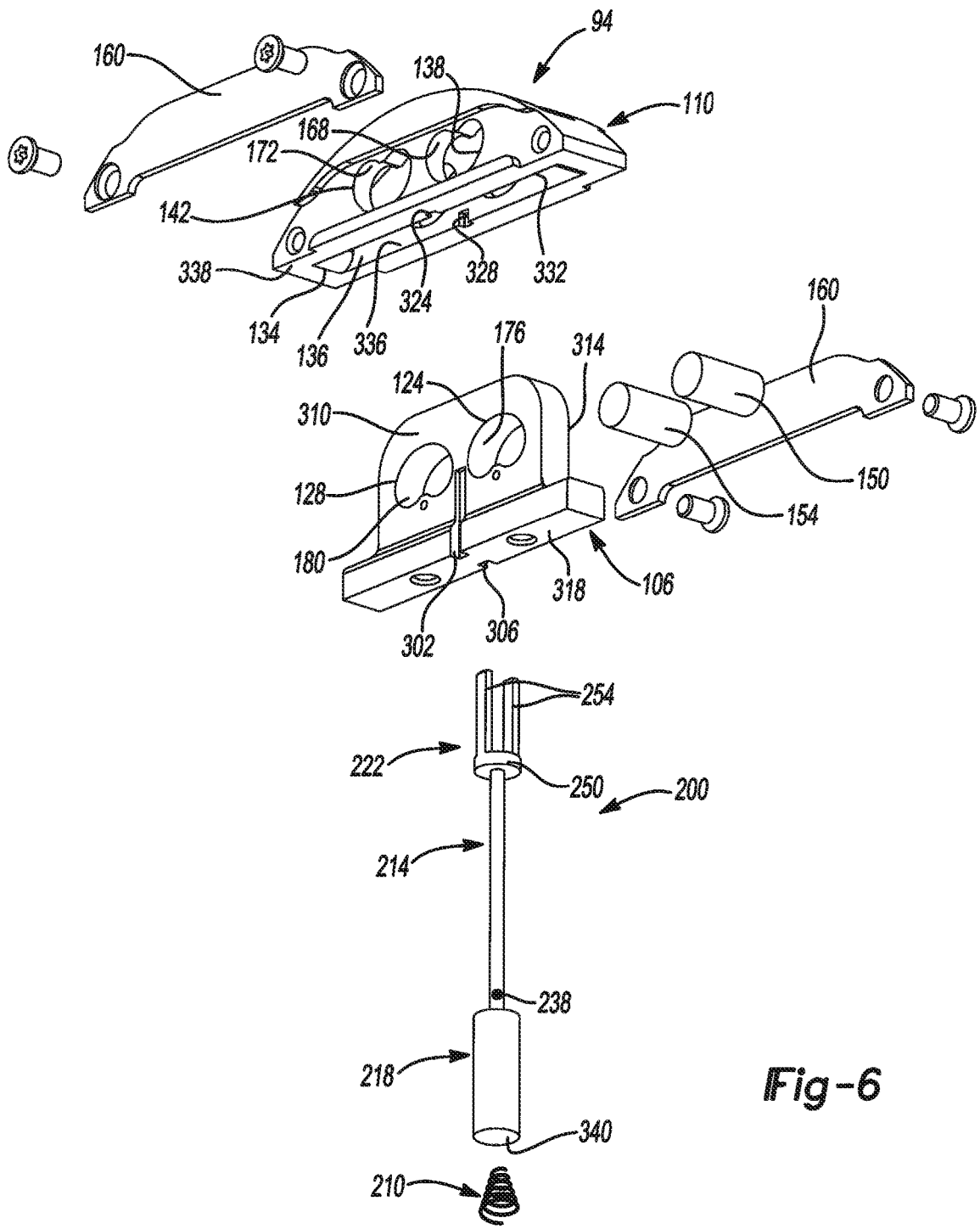
FIG. 6 is an exploded view of an exemplary torsional absorber and the exemplary centrifugal switch assembly in accordance with the teachings of the present disclosure.
Figure 7A:
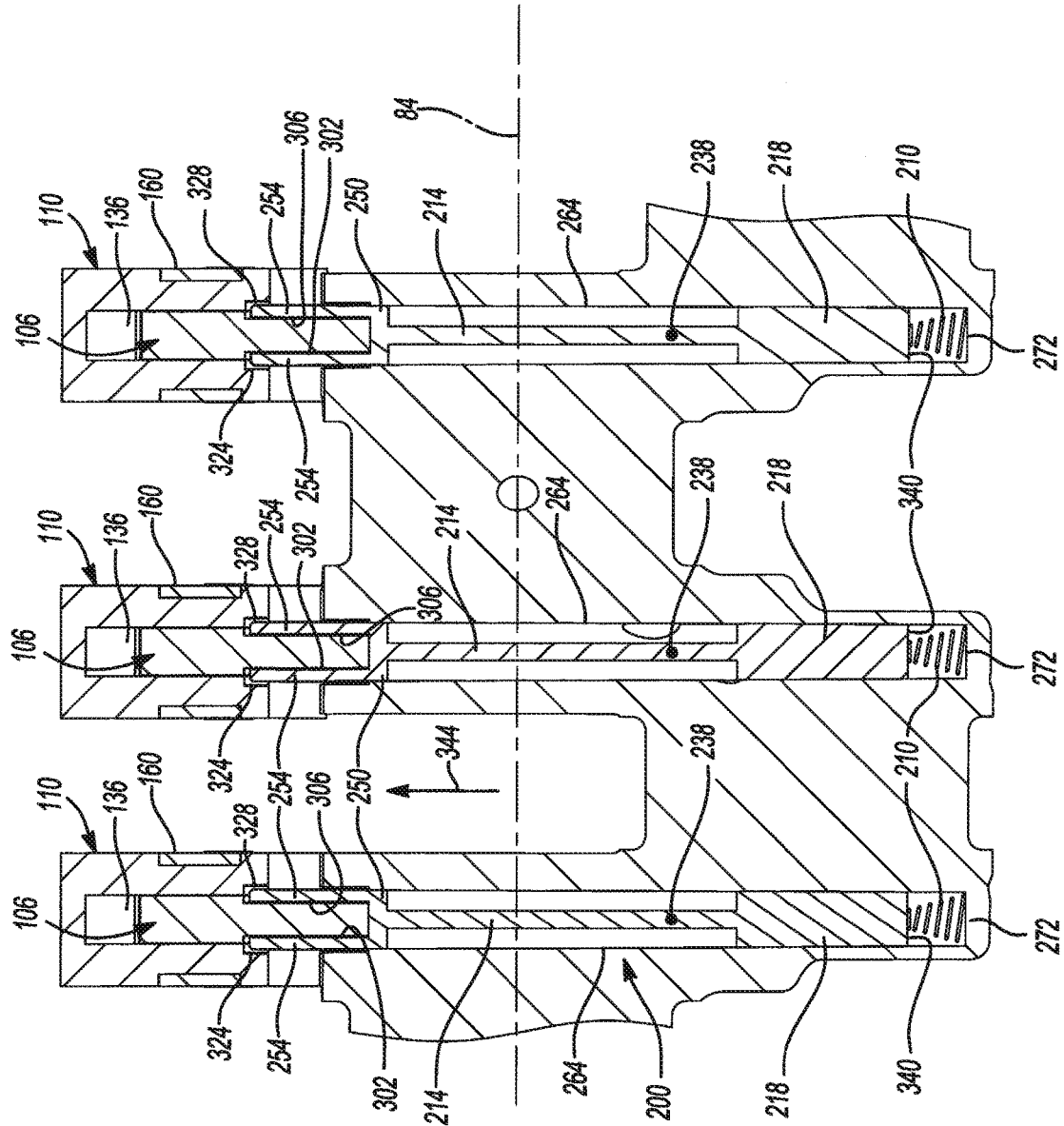
FIG. 7A is a sectional view of a portion of the crankshaft assembly of FIG. 2 illustrating the centrifugal switch assembly in an engaged position with the torsional absorber in accordance with the teachings of the present disclosure.
Figure 7B:
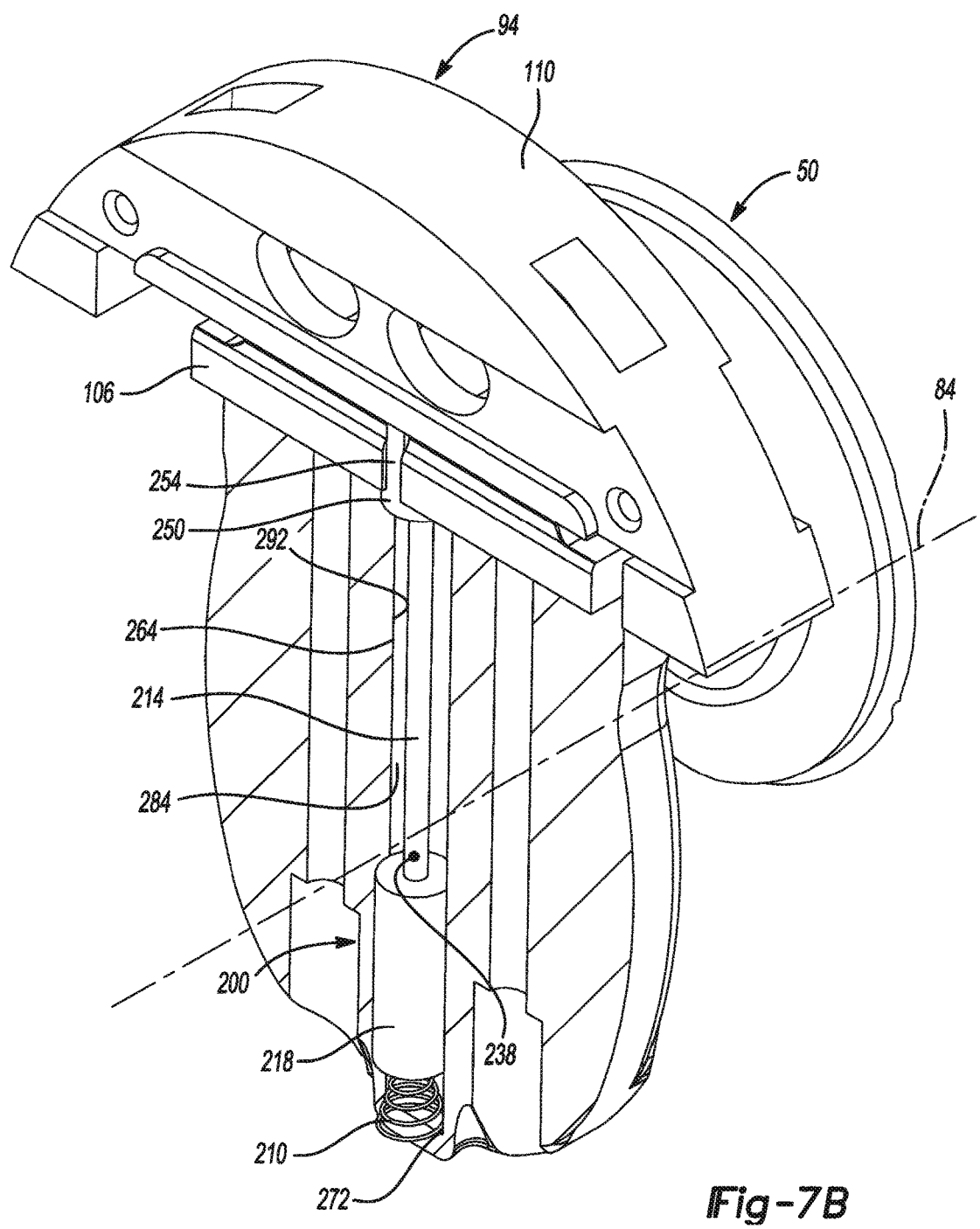
FIG. 7B is a partial sectional view of the crankshaft assembly illustrating the centrifugal switch assembly cooperating with the torsional absorber in the engaged position in accordance with the teachings of the present disclosure.
Figure 8A:
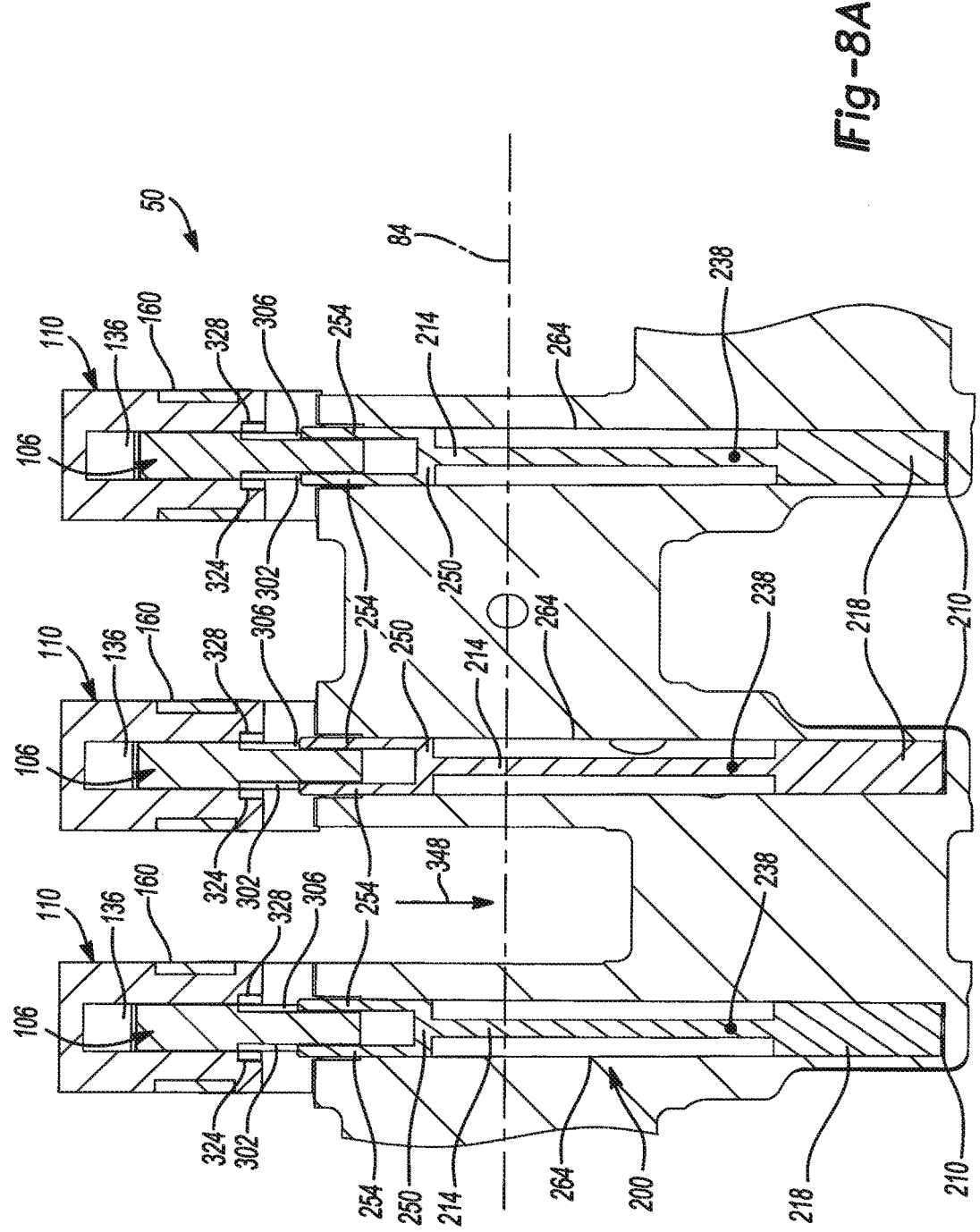
FIG. 8A is a sectional view of a portion of the crankshaft of FIG. 2 illustrating the centrifugal switch assembly in a disengaged position relative to the torsional absorber in accordance with the teachings of the present disclosure.

The pendulum 110 of the torsional absorber 94 can have a flange opening 134 and a hollow interior 136 (FIG. 6). The pendulum 110 can also have first and second openings 138, 142. The head portion 118 of the carrier 106 can pass through the flange opening 134 of the pendulum 110 and can reside in the pendulum's 110 hollow interior 136. The first flange opening 124 and the first pendulum opening 138 can be aligned so that a first circular pin 150 can pass through and reside within the openings 124, 138. Additionally, the second carrier opening 128 and the second pendulum opening 142 can be aligned so that a second circular pin 154 can pass through and reside within the openings 128, 142. The first and second pins 150, 154 can pivotally couple the pendulum 110 to the carrier 106 in a manner that provides the pendulum 110 with a limited range of free movement. Once the pins 150, 154 are positioned in their respective openings 124, 128, 138, 142, cover plates 160 (FIG. 2) can be attached to the sides of the pendulum 110 to secure the pins 150, 154 within the openings 124, 128, 138, 142. The cover plates 160 can be attached using a fastener, such as a bolt or screw, or an adhesive. Furthermore, one cover plate 160 may be attached to one side of pendulum 110 before the pins 150, 154 are placed in the openings 124, 128, 138, 142.

The pendulum 110 may be formed of a single material, such as, steel, tungsten, copper tungsten, tantalum, tungsten carbide, aluminum, and their alloys. The pendulum 110 may also be formed of one or more types of material. For example, the pendulum 110 may be formed of steel and have a tungsten or tantalum plug or multiple plugs to increase the mass of the pendulum 110. In another exemplary embodiment, it is desirable to position plugs of high density material in a secure manner to configure a pendulum whose center of mass is displaced away from the centerline axis of the powertrain revolution in a manner to dampen vibrations in the internal combustion engine. As another example, the pendulum 110 may be formed of aluminum and have steel or tungsten plugs to increase the mass of the pendulum 110.

Various materials, including heavy metals, may be used to increase the mass of the pendulum 110. An increase in pendulum mass without any corresponding change in pendulum size results in an increase in absorber inertia, defined as (pendulum mass)*$r^2$, where r is the distance from a center of rotation of the driveline to the center of mass of the pendulum 110. As increasing absorber inertia relative to the vehicle's powertrain inertia is desirable, efforts to increase the mass of pendulum 110 are also desirable. By using heavy or dense metals, the mass of the pendulum 110 may be increased without adding to packaging space requirements. Heavy metals include but are not limited to copper tungsten and tungsten carbide, for example.

FIG. 4 illustrates a front view of the lobe 78*b* of FIG. 3 in accordance with an exemplary embodiment. Each opening 124, 128, 138, 142 within the pendulum 110 and the carrier 106 can have a corresponding inner surface 168, 172, 176, 180. The inner surfaces 176, 180, 168, 172 can all have an identical epicycloidal configuration, but the orientation of the configurations are not identical. The epicycloidal inner surfaces 176, 180 of the openings 124, 128 of the carrier 106 are rotated 180 degrees with respect to the epicycloidal inner surfaces 168, 172 of the openings 138, 142 of the pendulum 110.

When the crankshaft 50 is rotating, centrifugal force can cause the pendulum 110 to extend away from the axis of rotation 84 of the crankshaft 50. When this happens, the pins 150, 154 can engage the inner surfaces 168, 172, 176, 180 as illustrated in FIG. 4. As the pendulum 110 moves, the first pin 150 can roll along the inner surface 168 of the first opening 138 of the pendulum 110 and the inner surface 176 of first opening 124 of the carrier 106 and the second pin 154 rolls along the inner surface 172 of the second opening 142 of the pendulum 110 and the inner surface 180 of the second opening 128 of the carrier 106. The rolling of the pins 150, 154 along their associated inner surfaces 168, 172, 176, 180 can cause the pendulum 110 to follow a precise epicycloidal path determined by the epicycloidal inner surfaces 168, 172, 176, 180. As a result, the pendulum 110 can be urged to operate at a resonant harmonic motion that corresponds and opposes vibrations of numerous frequencies generated by the engine 20 or torque converter 30. The opposing harmonic motion of the pendulum 110 reduces the vibrations transferred throughout the vehicle 10.

Because the epicycloidal path taken by the pendulum 110 is determined by the shape of the inner surfaces 168, 172, 176, 180, the path may be tuned to account for torsional fluctuations that typically occur at frequencies that are a definite multiple of average engine speed. For example, in one exemplary embodiment, the epicycloidal path may be tuned to allow the pendulum 110 to compensate for second order vibrations generated from a four-cylinder engine. A four cylinder engine typically has large second order torsional vibration components because there are two combustion events per rotation of the crank shaft. In another exemplary embodiment, the epicycloidal path may be adjusted to allow the pendulum 110 to compensate for fourth order vibrations generated from an eight-cylinder engine.

A pendulum of fixed geometry in a rotating field has a natural frequency that is proportional to the rotational speed. As a result, a large corrective dynamic response can occur whenever the pendulum is subjected to excitations of a specific multiple of average rotational speed. That is, a beneficial dynamic response occurs at multiples of mean rotation speed rather than at specific fixed target frequencies as in the case of a frequency tuned absorber. The natural frequency of the pendulum, and hence its corrective dynamic response to a target excitation order, tracks mean engine speed. For example, the target order (n), arising from combustion, for an 8 cylinder engine is 4 and for a 6 cylinder engine the target order is 3.

A family of prospective pendulum paths may be specified by defining the configuration of the inner surfaces 168, 172, 176, 180 according to Equation 1, as follows:

$$\rho^2 = \rho_0^2 - \lambda^2 S^2 \qquad \text{Equation 1.}$$

In Equation 1, $\rho_0$ is the radius of curvature of the path that corresponds to the pendulum apex (furthest point from the center of rotation), and S measures arc length distance along the pendulum path from this apex. When λ=0, curvature is constant, and the resulting path is a circle of radius $P_0$. When λ=1, the resulting curve is a cycloid. For λ between 0 and 1, the resulting curve is an epicycloid. Thus, the epicycloidal path followed by the pendulum 110, as determined by the epicycloidal inner surfaces 168, 172, 176, 180, may be tuned so that the path more closely resembles a circle, a cycloid, or any epicycloid on a continuum there between. For example, in one exemplary embodiment, a specific λ between 0 and 1 may be chosen based on the excitation order to be corrected by the pendulum 110 that causes the pendulum's 110 tuning to be independent of its amplitude of oscillation. The tuning that generates this independent amplitude of oscillation is commonly referred to as tautochronic tuning. If the target order to be corrected is n, then the tautochronic λ is expressed by Equation 2, below.

$$\lambda = \lambda_e = \sqrt{\frac{n^2}{n^2+1}}.$$
Equation 2

When λ is chosen in this way (in accordance with Equation 2), the resulting tautochronic epicycloidal path maintains the tuning of the pendulum 110 regardless of the magnitude of its dynamic response to the excitation order.

In another exemplary embodiment, an epicycloidal path corresponding to λ chosen between the tautochronic value of $\lambda_e$ and 1 may be chosen for the pendulum 110. In this embodiment, at lower amplitudes of excitation, the tuning of the pendulum 110 remains nearly constant. As a result, lower to moderate torsional vibrations generated by the engine 20 may be corrected with high efficiency. However, as the pendulum response amplitude increases, which may happen when excitation levels get high, the pendulum tuning shifts away from the excitation frequency. This shift tends to mitigate the response of the pendulum 110. As a result, the pendulum 110 efficiently corrects low to moderate targeted excitation order vibrations but does not over-respond to higher excitations.

Further, the pendulum 110 avoids a saturated response where the pendulum 110 may potentially hit the body of the crankshaft 50. Thus, by traversing a properly chosen epicycloidal path where λ is chosen between $\lambda_e$ and 1, the pendulum 110 corrects vibrations of low to moderate amplitude levels to produce acceptable vehicle drivability, even when there is a hard coupling between engine 20 and transmission 40 (i.e., when the torque converter is locked). At higher levels of torsional vibration, the pendulum 110 still functions without hitting the body and hence without introducing objectionable vehicle noise due to this sort of impact.

It should be noted that at these higher levels of vibration, other less fuel efficient vibration control measures may be implemented, such as unlocking the transmission torque converter 30 to thereby produce a viscous coupling between engine 20 and the transmission 40. This viscous coupling of engine 20 to transmission 40 limits the vibration a driver or passenger feels within the vehicle. It is desirable to employ an apparatus that dampens the vibrations of a crankshaft that does not act as a vibrational amplifier, yet dampens vibrations at frequencies that are a specified multiple of engine rotation speed.

Unfortunately, unlocking the torque converter 30 can introduce inefficiencies, such as a decrease in fuel economy and other inefficiencies. An epicycloidal path where λ is chosen between $\lambda_e$ and 1, augments the possible excitation amplitudes the pendulum 110 can absorb without hitting the body 102. At the same time, such a path preserves the pendulum's 110 capability of correcting low to moderate amplitudes that would otherwise require inefficient torque converter 30 unlock calibrations. Furthermore, having the pendulum 110 traverse a properly chosen epicycloidal path prevents the pendulum 110 from becoming a vibration amplifier even when the amplitude of the excitation order becomes large.

In an exemplary embodiment for a predetermined vehicle and powertrain rotational inertia configuration, an acceptable threshold for vibration amplitudes of the crankshaft may be 0 to 2 degree peak to peak second order crank angle deviations. A configuration of a pendulum having a tautochronic epicycloidal path tuned as described herein may be utilized with the crankshaft to reduce approximately 50% of the second order vibrations.

In another exemplary embodiment, for a predetermined vehicle and powertrain rotational inertia configuration, an acceptable threshold for driveline vibration out of the engine and into the transmission might be 0 to 1 degree peak-to-peak second order crank angle deviations. If crank angle as a function of time may be expressed in radians as θ=ωt+a sin(nωt) where ω is the mean rotation speed in radians/second, then the order n degrees peak-to-peak measure p of oscillation is p=2a (180/Π). A pendulum configuration operating on the crankshaft of the engine that reduces the source order n vibration levels by 50% for pendulum swings induced by 0 to 2 degree peak-to-peak engine vibration amplitudes will reduce what would otherwise be 2 degree peak-to-peak oscillation amplitudes to below 1 degree peak-to-peak. If the pendulum configuration produced a tautochronic path (so that its tuning does not shift as pendulum amplitudes increases), the pendulum would tend to hit a motion pad sooner than a pendulum tuned away from a tautochronic path toward a cycloidal path. Pendulums tuned within a range of paths, not including substantially tautochronic paths but those toward cycloidal, can function within a larger range of vibration amplitudes without hitting the motion pad(s) to potentially cause powertrain noise. At the same time, the correction performance at lower amplitudes is nearly as good as substantially tautochronic path pendulums.

An additional advantage of the pendulum paths that are tuned towards cycloids is that the bifilar slots that create the pendulum hinges tend to be narrower, and therefore impose less of a packaging burden on the design. The carrier flange, for example, can be somewhat smaller because the motion slots in which the rollers move are smaller. Similarly, the mass of the pendulum can be slightly higher, because less mass must be subtracted from the pendulum blank to create the motions slots on the pendulum. A further discussion of the crankshaft 50 having the torsional absorber 94 discussed above can be found in U.S. application Ser. No. 13/277,443 filed on Oct. 20, 2011, the disclosure of which is incorporated by reference herein in its entirety.

With additional reference to FIGS. 5-9 and continuing reference to FIGS. 1-4, a centrifugal switch assembly 200 of the crankshaft assembly 50 will now be discussed in greater detail. The centrifugal switch assembly 200 can function as a speed sensitive locking device configured to engage and disengage the pendulum 110 at a predetermined engine speed thereby selectively locking or immobilizing (when engaged) the pendulum 110 in a neutral position. Selectively fixing the pendulum in the neutral position can be desirable at lower engine speeds and/or during start/stop cycles where there can be a potential for the pendulum to reach or hit its travel limits. To the extent the pendulum 110 would hit its travel limits, this could result in potentially objectionable rattles and/or noises to a driver and/or occupant of vehicle 10.

The centrifugal switch assembly 200 can, in the exemplary embodiments illustrated, include a biasing member 210 and a body 214 coupled to a mass member 218 and a lock member 222. In one exemplary configuration, the mass member 218 can be positioned at a first end 226 of the body 214 and the lock member 222 can be positioned at a second opposite end 230 of body 214. The biasing member 210 can be configured to engage the mass member 218, as will be discussed in greater detail below in connection with a discussion of the operation of the centrifugal switch assembly 200.

In the exemplary embodiments illustrated, the mass member 218 and the body 214 can each have a cylindrical shape, with the mass member 218 having a larger diameter than the body 214. It will be appreciated, however, that the body 214 and the mass member 218 can be provided in various shapes and/or configurations so long as a center of mass 238 of the switch assembly 200 is concentrated relative to the first end 226 of the body 214 and on an opposite side of the center of rotation or crank axis 84 of crankshaft assembly 50, as will also be discussed in greater detail below. It will also be appreciated that the mass member 218 and the body 214 can be integrally formed or can be separate components coupled or assembled together.

The lock member 222 can include a base 250 and first and second spaced apart lock pins 254 extending axially therefrom. In one exemplary configuration, the lock pins 254 can form a forked end 258 of the centrifugal switch assembly 200 configured to slidably engage the carrier 106 and selectively engage the pendulum 110, as will also be described in greater detail below.

The centrifugal switch assembly 200 can be positioned in a channel or bore 264 formed in one or both of crank lobes 78a, 78b, as shown for example in FIGS. 7A-8B. In one exemplary embodiment, the bore 264 can be positioned between two bores 268 configured to receive fasteners (not specifically shown) to secure carrier 106 to crankshaft 50. In this exemplary embodiment, the bore 264 can be substantially laterally centered along a plane perpendicular to the axis of rotation 84. The bore 264 can include a first, closed or blind end 272 and a second opposite, open end 276.

In one exemplary embodiment, the bore 264 can include a circular shape in cross-section with an inside or inner diameter 284 complimentary to an outer diameter 288 of the mass member 218 and the base 250 of lock member 222. With this configuration, centrifugal switch assembly 200 can be slidably positioned in bore 264 with the mass member 218 and the base 250 being slidably guided by an inner wall 292 of bore 264.

The carrier 106 can include first and second slots or channels 302, 306 on respective front and rear sides 310, 314 configured to slidably receive the first and second lock pins 254, as will be discussed in greater detail below. The first and second channels 302, 306 can extend from a bottom or lower side 318 of carrier 106 and between the first and second head openings 124, 128, as shown for example in FIG. 6. An axial length of pins 254 can be sized such that the pins 254 will engage the channels 302, 306 when the centrifugal switch assembly 200 is in an engaged position (e.g., FIG. 7A) with pendulum 110, a disengaged position (e.g., FIG. 8A) with pendulum 110 and any position therebetween. A length of body 214 and mass member 218 can be sized such that the base 250 of lock member 222 engages or substantially engages the lower side 318 of carrier 106 when the centrifugal switch assembly 200 is in the engaged or fully engaged position (FIG. 7A) while providing a sufficient space in the axial direction for biasing member 210, which will be discussed in greater detail below in connection with operation of the centrifugal switch assembly 200.

The pendulum 110 can also include first and second slots or channels 324, 328 on inner front and rear sides 332, 336 extending from a lower side 338 that forms flange opening 134. In the exemplary embodiments illustrated, the channels 324, 328 can be formed on the inner front and rear sides 332, 336, which form front and rear inner walls of the hollow interior 136. The first and second channels 324, 328 can be configured to selectively slidably receive lock pins 254 when centrifugal switch assembly 200 is in the engaged position (e.g., FIG. 7A) with pendulum 110. In the exemplary embodiments illustrated, the pendulum channels 324, 328 can have a shorter axial length than the carrier channels 302, 306 and can be configured to receive only the distal ends of the lock pins 254. In one exemplary embodiment, channels 302, 306 and 324, 328 can be blind channels extending only partially into the carrier 106 and pendulum 110, respectively.

The biasing member 210 can be provided in various different forms and configurations, such as the spring shown in the various figures. In the exemplary embodiments illustrated, the spring 210 can be a conical or tapered compression spring configured to be positioned in the bore 264 between the blind end 272 and a lower end 340 of the mass member 218. The tapered compression spring 210 can be advantageous for this application due to its small space requirements and low compression height. As will be discussed in greater detail below, the centrifugal switch assembly 200 can be spring loaded by the biasing member 210 to move in a first direction 344 to selectively engage and lock the pendulum 110 below a predetermined engine RPM, and to move in a second opposite direction 348 above the predetermined RPM due to centrifugal force to disengage or unlock pendulum 110.

With particular reference to FIGS. 2 and 6-9, operation of the centrifugal switch assembly 200 in connection with the crankshaft assembly 50 will now be discussed in greater detail. As briefly discussed above, the centrifugal switch assembly 200 is a speed sensitive locking device designed and configured to selectively engage and disengage the pendulum 110 at a predetermined engine speed (i.e., RPM) thereby locking/unlocking the pendulum 110 relative to a neutral position. Locking the pendulum in the neutral position can be desirable at lower engine speeds and start/stop cycles where there can be a tendency for the pendulum 110 to hit its travel limits.

The centrifugal switch assembly 200 can be installed in the bore 264 in the manner discussed above such that the conical spring 210 is in engagement with the blind end 272 of bore 264 and the lower end 340 of mass member 218. The architecture of the centrifugal switch assembly 200 can be configured such that the lock member 22 is on a first side of the center of rotation 84 of crankshaft assembly 50 along with torsional absorber 94, and the mass member 218 and center of mass 238 are on a second opposite side, as shown for example in FIGS. 7A-8B.

The weight of the mass member 218 and the spring rate of the spring 210 can be selected and tuned relative to the desired activation engine speed such that the centrifugal force at or above such engine speed will overcome the spring rate and move the centrifugal switch assembly 200 in the second direction 348 away from the torsional absorber 94 to disengage or unlock pendulum 110 from the neutral position. Conversely, at or below the desired engine speed, the biasing force of the tuned spring 210 can overcome the centrifugal force and urge the centrifugal switch assembly 200 in the first direction 344 such that the lock pins 254 can slide in the first direction in carrier channels 302, 306 and engage pendulum channels 324, 328 to lock pendulum 110 in the neutral position.

In one exemplary operating condition, the centrifugal switch assembly 200 can be self-regulating based on the tuned weight of the mass member 218, length of the body 214 and spring rate of biasing member 210 to automatically engage and disengage pendulum 110 below and above, respectively, the desired engine speed. In other words, the tuned centrifugal switch assembly 200 can automatically engage and disengage pendulum 110 based on centrifugal force such that there is not a need for specific engine control algorithms or other actuation devices to facilitate engagement and disengagement of centrifugal switch assembly 200. The use of two lock pins 254 in connection with both the front and rear channels 302, 306 of carrier 106 and the front and rear channels 324, 328 of pendulum 110 can also mitigate any offset loading.

Figure 9:
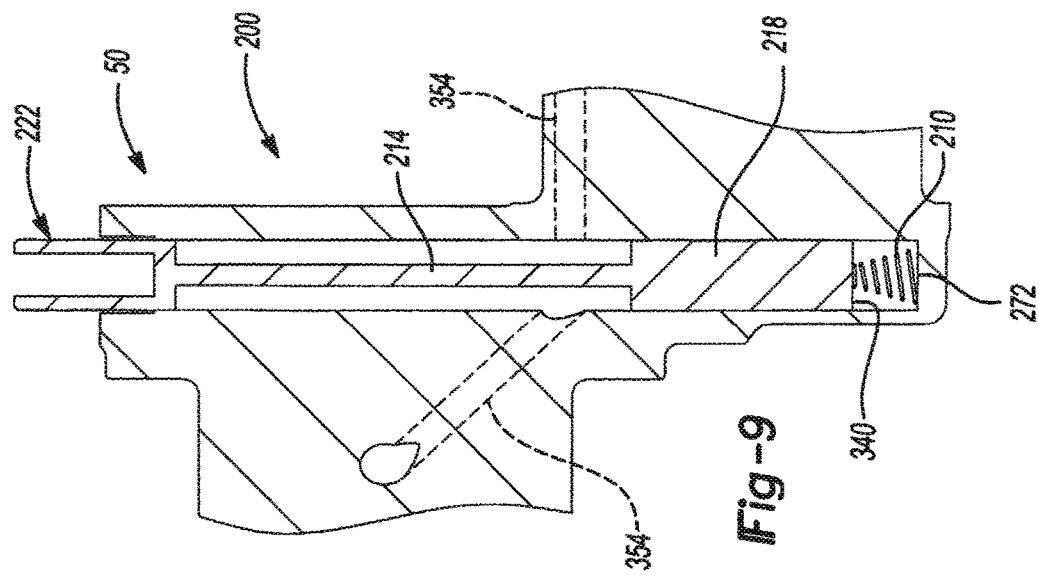
FIG. 9 is a partial sectional view of the crankshaft and centrifugal switch assembly illustrating an exemplary crankshaft oil passage in accordance with the teachings of the present disclosure.
Figure 8B:
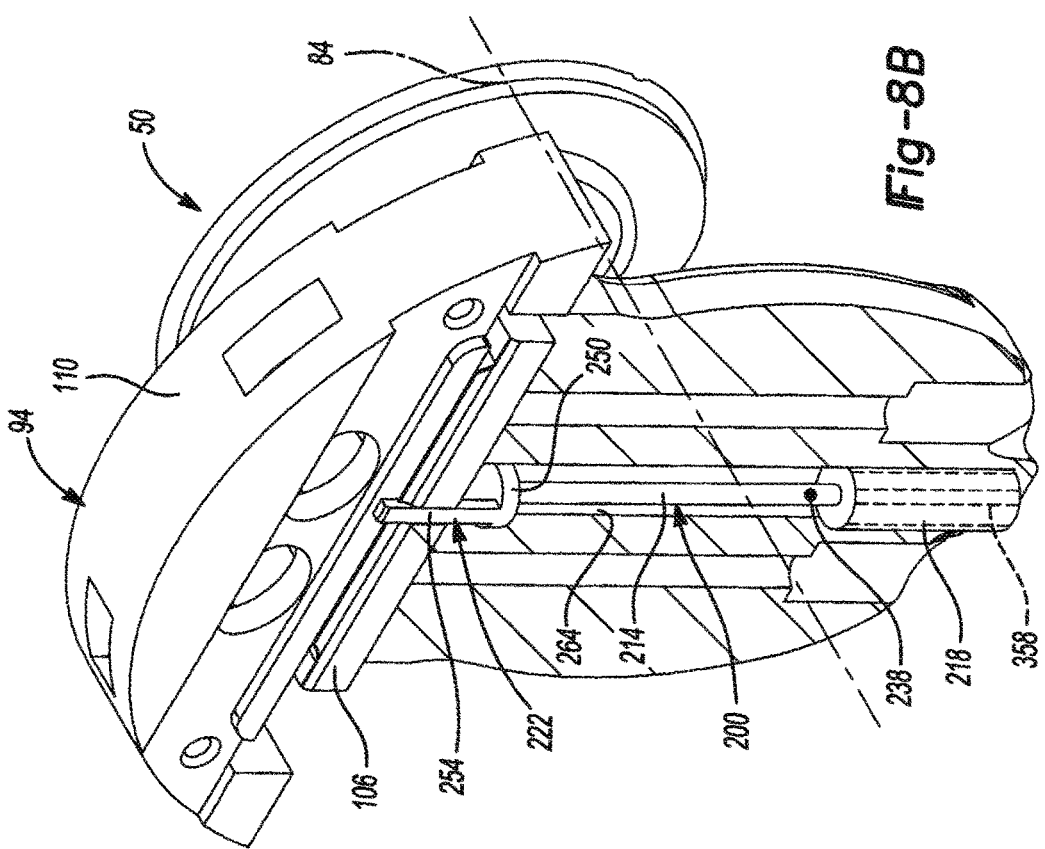
FIG. 8B is a partial sectional view of the crankshaft illustrating the centrifugal switch assembly cooperating with the torsional absorber in the disengaged position in accordance with the teachings of the present disclosure.

With particular reference to FIGS. 8B and 9, the centrifugal switch assembly 200 can be designed with an architecture that considers placement of oil passages in the crankshaft assembly 50 to ensure free flow of lubrication oil to the crankshaft journals. For example, the centrifugal switch assembly 200 can be configured such that the mass member 218 and/or body 214 do not block an intersection of one or more crankshaft oil passage(s) 354 and bore 264 in both the engaged and disengaged positions. This will maintain an open passage in the crankshaft oil circuit cross drillings, as shown for example in FIG. 9. Further, the mass member 218 can include adequate cylindrical clearance relative to bore 264 and/or optional relief grooves 358 to provide for maintaining oil around (e.g., above and below) the mass member 218 in bore 264 and for oil to move or flow from above mass member 218 to below mass member 218 and vice versa during movement of centrifugal switch assembly 200 in the first and second directions.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A crankshaft assembly for an internal combustion engine, comprising:
   a crankshaft having a lobe with a pendulum absorber coupled thereto, the pendulum absorber including:
      a carrier coupled to a body of the lobe and having an opening therein,
      a pendulum having an opening therein, and
      a pin extending through the pendulum opening and the carrier opening to pivotably couple the pendulum to the carrier; and
   a switch assembly slidably positioned in a bore of the body and having a lock member configured to selectively engage the pendulum based on a centrifugal force being below a predetermined threshold to lock movement of the pendulum relative to the carrier, the switch assembly including:
      a body coupled at a first end to a mass member and at a second opposite end to the lock member; and
      a biasing member positioned in the bore and configured to engage the mass member to bias the switch assembly toward an engaged position where the lock member engages the pendulum to lock the pendulum,
   wherein the crankshaft comprises a center of rotation, and wherein the mass member and a center of mass of the switch assembly are positioned on a first side of the center of rotation opposite the pendulum absorber and the lock member is positioned on a second opposite side of the crankshaft center of rotation.

2. The crankshaft assembly of claim 1, wherein a weight of the mass member is selected such that the switch assembly is tuned to overcome a biasing force of the biasing member at a predetermined RPM based on the centrifugal force generated by rotation of the crankshaft being greater than the biasing force of the biasing member.

3. The crankshaft assembly of claim 2, wherein when the crankshaft rotation speed is above the predetermined RPM, the switch assembly is configured to move in a direction away from the pendulum absorber against the biasing force of the biasing member to a disengaged position.

4. The crankshaft assembly of claim 3, wherein the biasing member includes a compression spring.

5. The crankshaft assembly of claim 4, wherein the biasing member includes a conical compression spring.

6. The crankshaft assembly of claim 3, wherein the lock member includes a pair of spaced apart axially extending lock pins.

7. The crankshaft assembly of claim 6, wherein the lock pins slidably engage channels in first and second opposed sides of the carrier.

8. The crankshaft assembly of claim 7, wherein the lock pins selectively engage channels in opposed walls of the pendulum when the switch assembly is in the engaged position to lock the pendulum and are spaced apart from the pendulum channels when the switch assembly is in the disengaged position.

9. The crankshaft assembly of claim 8, wherein the pendulum defines a hollow interior having first and second opposed inner walls, the carrier being received in the hollow interior between the first and second opposed inner walls, the pendulum channels being formed in the first and second opposed inner walls of the pendulum.

10. The crankshaft assembly of claim 9, wherein the lock pins slidably engage carrier channels formed in opposed outer walls of the carrier and selectively slidably engage the pendulum channels formed in the first and second opposed inner walls of the pendulum such that the lock pins are positioned between the opposed outer walls of the carrier and the respective opposed inner walls of the pendulum when engaged with the pendulum.

11. The crankshaft assembly of claim 1, wherein the pendulum opening and the carrier opening having an epicycloidal configuration that causes the pendulum to follow an epicycloidal path when the crankshaft rotates, and wherein the epicycloidal configuration lies on a continuum between a tautochronic configuration and a cycloidal configuration.

12. The crankshaft assembly of claim 11, wherein the carrier includes a second opening and the pendulum includes a second opening and wherein a second pin extends through the second pendulum opening and the second carrier opening to pivotably couple the pendulum to the carrier, the second pendulum opening and the second flange opening having the epicycloidal configuration.

13. A crankshaft assembly for an internal combustion engine, comprising:
- a crankshaft having a lobe with a pendulum absorber coupled thereto, the pendulum absorber including:
  - a carrier coupled to a body of the lobe and having an opening therein,
  - a pendulum having an opening therein, and
  - a pin extending through the pendulum opening and the carrier opening to pivotably couple the pendulum to the carrier, the pendulum opening and the carrier opening having an epicycloidal configuration; and
- a centrifugal switch assembly slidably positioned in a bore of the body and having a biasing member and a lock member, the lock member configured to i) selectively engage the pendulum based on a centrifugal force being below a predetermined threshold to lock movement of the pendulum relative to the carrier, and ii) selectively disengage from the pendulum against a biasing force of the biasing member based on the centrifugal force being above the predetermined threshold, the switch assembly further comprising a body coupled at a first end to a mass member and at a second opposite end to the lock member, wherein the biasing member is configured to engage the mass member to bias the switch assembly toward an engaged position where the lock member engages the pendulum to lock the pendulum, wherein the crankshaft comprises a center of rotation, and wherein the mass member and a center of mass of the switch assembly are positioned on a first side of the center of rotation opposite the pendulum absorber and the lock member is positioned on a second opposite side of the crankshaft center of rotation.

14. The crankshaft assembly of claim 13 wherein a weight of the mass member is selected such that the switch assembly is tuned to overcome the biasing force of the biasing member at a predetermined RPM based on the centrifugal force generated by rotation of the crankshaft being greater than the biasing force of the biasing member.

15. The crankshaft assembly of claim 14, wherein when the crankshaft rotation speed is above the predetermined RPM, the switch assembly is configured to move in a direction away from the pendulum absorber against the biasing force of the biasing member to a disengaged position.

16. The crankshaft assembly of claim 14, wherein the lock member includes a pair of spaced apart axially extending lock pins, the lock pins being in sliding engagement with channels formed in first and second opposed outer sides of the carrier and in selective engagement with channels formed in first and second opposed inner sides of the pendulum.

17. The crankshaft assembly of claim 16, wherein the lock pins selectively engage the pendulum channels when the switch assembly is in the engaged position to lock the pendulum and are spaced apart from the pendulum channels when the switch assembly is in the disengaged position.

* * * * *